US009537181B2

(12) United States Patent
Ahn et al.

(10) Patent No.: US 9,537,181 B2
(45) Date of Patent: Jan. 3, 2017

(54) BATTERY PACK

(71) Applicant: Samsung SDI Co., Ltd., Yongin, Gyeonggi-do (KR)

(72) Inventors: Byung-Kook Ahn, Yongin (KR); Il-Oh Kang, Yongin (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 547 days.

(21) Appl. No.: 13/782,900

(22) Filed: Mar. 1, 2013

(65) Prior Publication Data
US 2014/0065448 A1 Mar. 6, 2014

(30) Foreign Application Priority Data
Sep. 6, 2012 (KR) .................... 10-2012-0098958

(51) Int. Cl.
*H01M 2/02* (2006.01)
*H01M 10/42* (2006.01)
*H01M 10/48* (2006.01)

(52) U.S. Cl.
CPC .......... *H01M 10/4257* (2013.01); *H01M 2/02* (2013.01); *H01M 10/486* (2013.01); *H01M 2200/00* (2013.01)

(58) Field of Classification Search
CPC ................................... H01M 2/02
USPC ............................................. 429/7
See application file for complete search history.

(56) References Cited

U.S. PATENT DOCUMENTS

| 5,585,710 A | 12/1996 | Nakamura et al. |
| 9,190,643 B2 | 11/2015 | Lee |
| 2001/0046624 A1* | 11/2001 | Goto et al. ............... 429/99 |
| 2003/0146734 A1 | 8/2003 | Kozu et al. |
| 2005/0052826 A1* | 3/2005 | Yi ........................... 361/636 |
| 2006/0166086 A1* | 7/2006 | Kato ................... H01M 2/021 429/153 |
| 2009/0246611 A1 | 10/2009 | Kim |
| 2012/0225334 A1 | 9/2012 | Lee |
| 2012/0251849 A1 | 10/2012 | Park et al. |
| 2013/0143074 A1 | 6/2013 | Kim |
| 2013/0171767 A1 | 7/2013 | Moslehi et al. |
| 2014/0044995 A1 | 2/2014 | Moon et al. |

(Continued)

FOREIGN PATENT DOCUMENTS

| CN | 1770501 A | 5/2006 |
| CN | 101346832 A | 1/2009 |

(Continued)

OTHER PUBLICATIONS

Korean Office Action dated Oct. 31, 2014 for Korean Patent Application No. KR 10-2014-0071493 which corresponds to captioned U.S. Appl. No. 14/461,077, and cites the above-identified references numbered 4-7.

(Continued)

*Primary Examiner* — Basia Ridley
*Assistant Examiner* — James Erwin
(74) *Attorney, Agent, or Firm* — Knobbe, Martens, Olson & Bear, LLP

(57) ABSTRACT

A battery pack is disclosed. The battery pack includes a battery cell, a protection circuit module, and a temperature sensor, which are each held by a case. The case includes a dedicated space for the temperature sensor and a fixing element to fix the temperature sensor in the dedicated space.

21 Claims, 4 Drawing Sheets

(56) References Cited

U.S. PATENT DOCUMENTS

2014/0065448 A1  3/2014  Ahn et al.

FOREIGN PATENT DOCUMENTS

| CN | 102130321 A | 7/2011 |
|---|---|---|
| JP | 7-85896 (A) | 3/1995 |
| JP | 2000-277069 (A) | 10/2000 |
| JP | 2002-025633 A | 1/2002 |
| JP | 2002-100337 (A) | 4/2002 |
| JP | 2002-117819 A | 4/2002 |
| JP | 2012-133890 (A) | 7/2012 |
| KR | 2000-0019199 U | 11/2000 |
| KR | 10-2009-0103427 (A) | 10/2009 |
| KR | 10-2012-0111267 (A) | 10/2012 |
| KR | 10-1261769 (B1) | 4/2013 |
| KR | 10-2014-0021468 (A) | 2/2014 |
| KR | 10-2014-0032596 (A) | 3/2014 |
| KR | 10-2014-0041602 (A) | 4/2014 |

OTHER PUBLICATIONS

First Chinese Office Action dated Aug. 31, 2016 for Chinese Patent Application No. CN 201310170718.0, which shares priority of Korean Patent Application No. KR 10-2012-0098958 with subject U.S. Appl. No. 13/782,900, and cites the above-identified previously undisclosed references numbered 1-4.

* cited by examiner

BATTERY PACK

CROSS-REFERENCE TO RELATED APPLICATIONS

This application claims the benefit of Korean Patent Application No. 10-2012-0098958, filed on Sep. 6, 2012, in the Korean Intellectual Property Office, the disclosures of which are incorporated herein in their entirety by reference.

BACKGROUND

Field

The disclosed technology relates to a battery pack, and more particularly to a battery having a temperature sensor.

Description of the Related Technology

As wireless internet and communication technology has developed, the use of portable computers, such as tablet PCs or laptops that may be operated using a battery, has rapidly become widespread. Generally, a portable computer is excellent in terms of convenience because it has a small size and is convenient to carry. Thus, portable computers are widely used for in-office and personal use. An embedded battery pack may be included in a portable computer in order to use the computer without the need to connect to a power supply device. The battery pack may include a secondary battery that may be repeatedly charged and discharged.

A battery pack enabling long term use may include a structure that may monitor temperature information of battery cells and sense an emergency condition, such as overheating, to prevent problems, such as an explosion of the battery pack.

SUMMARY OF CERTAIN INVENTIVE ASPECTS

One or more embodiments of the present invention include a battery pack, and more particularly, a structure of a battery pack.

One inventive aspect is a battery pack. The battery pack includes a battery cell, a protection circuit module electrically connected to the battery cell, and a temperature sensor configured to measure a temperature of the battery cell. The battery pack also includes a case holding the battery cell and the protective circuit module, where the case includes a particular space for the temperature sensor and a fixing element configured to fix the temperature sensor in the particular space.

Another inventive aspect is a battery pack. The battery pack includes a battery cell, a protection circuit module electrically connected to the battery cell, and a temperature sensor configured to measure a temperature of the battery cell. The battery pack also includes a case holding the battery cell and the protective circuit module, where the case includes a partition defining a particular space for the temperature sensor to be held, and a fixing element configured to fix the temperature sensor in the particular space.

Another inventive aspect is a battery pack. The battery pack includes a battery cell, a protection circuit module electrically connected to the battery cell, and a temperature sensor configured to measure a temperature of the battery cell and to transmit an electrical signal based on the temperature to the protective circuit module. The battery pack also includes a case defining locations for the battery cell and the protective circuit module, where the case includes a frame including an outer wall that extending in a thickness direction and substantially surrounding the battery cell and the protective circuit module, and a lower rib formed perpendicular to the outer wall, where a particular space for the temperature sensor and a fixing element configured to fix the temperature sensor to the lower rib are formed on the lower rib.

BRIEF DESCRIPTION OF THE DRAWINGS

These and/or other aspects will become apparent and more readily appreciated from the following description of certain embodiments, taken in conjunction with the accompanying drawings of which.

DETAILED DESCRIPTION OF CERTAIN INVENTIVE EMBODIMENTS

Figure 1:
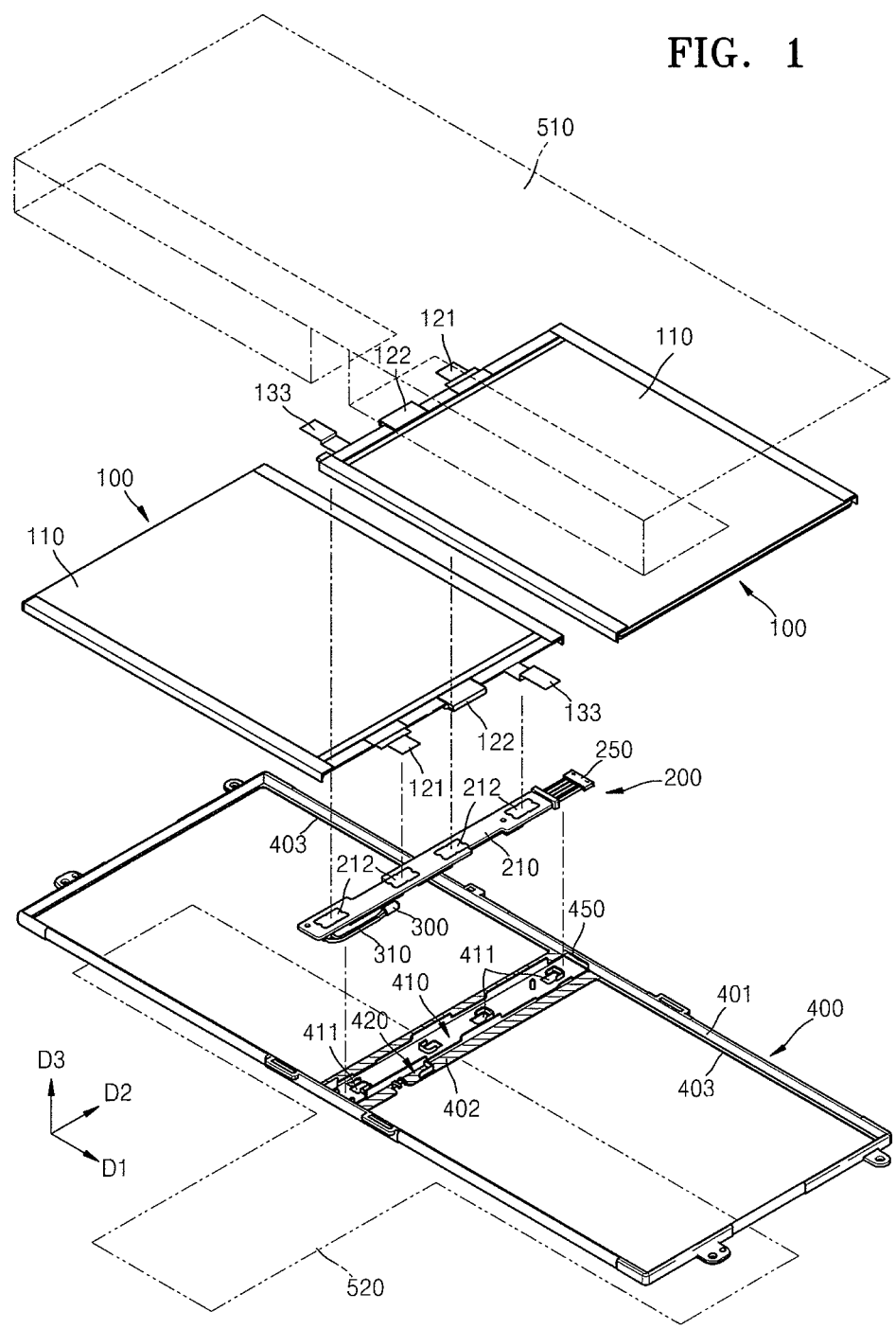
FIG. 1 is an exploded perspective view schematically illustrating a battery pack according to an embodiment.

Reference will now be made in detail to certain embodiments, examples of which are illustrated in the accompanying drawings. Like reference numerals generally refer to like elements throughout. Actual implementations may have different forms and should not be construed as being limited to the descriptions set forth herein. Accordingly, certain embodiments are described below with reference to the figures to explain certain aspects and principles. Expressions such as "at least one of," when preceding a list of elements, modify the entire list of elements and do not modify the individual elements of the list.

Hereinafter, certain aspects and features are described in the context of certain embodiments and with reference to the attached drawings. In the drawings, illustrative embodiments are shown. This invention may, however, be embodied in many different forms and should not be construed as being limited to the embodiments set forth herein. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that although the terms first and second are used herein to describe various elements, these elements should not be limited by these terms. These terms are only used to distinguish one element from another element. Thus, a first element discussed below could alternatively be termed a second element, and similarly, a second element may alternatively be termed a first element without departing from the teachings of this disclosure.

Figure 2:
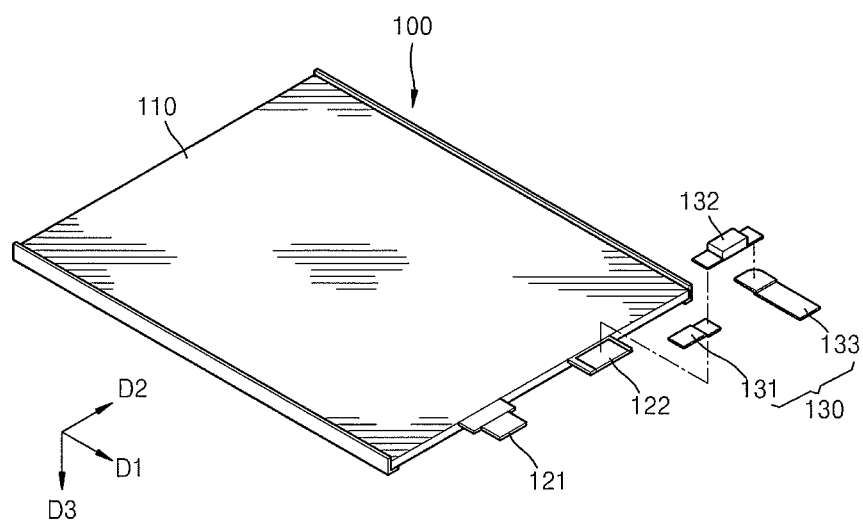
FIG. 2 is a perspective view illustrating an embodiment of a battery cell of the battery pack of FIG. 1.

FIG. 1 is an exploded perspective view schematically illustrating a battery pack according to an embodiment. FIG. 2 is a perspective view illustrating an embodiment of a battery cell in the battery pack of FIG. 1. Referring to FIG. 1, a battery pack according to an embodiment may include a battery cell 100, a protection circuit module 200, a temperature sensor 300, and a case 400.

The battery cell 100 may be a rechargeable secondary battery that may, for example, include a lithium-ion battery. The battery cell 100 may include an electrode assembly (not shown) and a pouch 110 accommodating the electrode assembly. The electrode assembly may be manufactured by stacking a positive electrode plate, a negative electrode plate, and a separator therebetween and rolling the stack in a jelly roll type formation. Alternatively, the electrode assembly may be manufactured by stacking one or more stacks each sequentially including a positive electrode plate, a separator, and a negative electrode plate. In the current embodiment, the battery cell 100 is described as being a lithium-ion battery, but the present invention is not limited thereto, and the battery cell 100 may be another type of battery, for example a nickel-cadmium battery or a nickel-hydrogen battery.

Referring to FIGS. 1 and 2, a positive electrode tab 121 and a negative electrode tab 122 may extend from one side of the battery cell 100. The positive electrode tab 121 is electrically connected to a positive electrode plate of the electrode assembly, and the negative electrode tab 122 is electrically connected to a negative electrode plate of the electrode assembly.

A temperature cutoff (TCO) assembly 130 may be electrically connected to either or both of the negative electrode tab 122 and the positive electrode tab 121. The TCO assembly 130 may include a TCO 132 and a first spare lead 131 and a second spare lead 133 that are respectively located at the ends of the TCO 132.

As shown in FIG. 2, one end of the first spare lead 131 is connected to the negative electrode tab 122, and the other end is connected to the TCO 132. One end of the second spare lead 133 is connected to the TCO 132. Both ends of the first spare lead 131 may be connected through welding to the negative electrode tab 122 and an end of the TCO 132, and the second spare lead 133 may also be connected through welding to the TCO 132.

In the current embodiment, the TCO assembly 130 is electrically connected to the negative electrode 122 of the battery cell 100, but the present invention is not limited thereto, and in another embodiment, the TCO assembly 130 may be electrically connected to the positive electrode tab 121 of the battery cell 100.

The battery cell 100 may include one or more battery packs, and as shown in FIG. 1, if two battery cells 100 are included, the electrode tabs 121 and 122 of each of the battery cells 100 may be disposed facing each other, and a protection circuit module 200 may be disposed between the battery cells 100.

The protection circuit module 200 may be electrically connected with a plurality of the battery cells 100. According to an embodiment, of the positive electrode tab 121 and the negative electrode tab 122 located on the one side of the protection circuit module 200 are welded to a connection unit 212 of the protection circuit module 200, and the positive electrode tab 121 and the negative electrode tab 122 of the battery cell 100, located on the other side of the protection circuit module 200 are welded to the connection unit 212 of the protection circuit module 200. Accordingly, the protection circuit module 200 and the battery cells 100 are electrically connected. However, if the TCO assembly 130 is connected to the negative electrode tab 122 as shown in FIG. 2, the positive electrode tab 121 of the battery cell 100 and the second spare lead 133 of the TCO assembly 130 may each be welded to the connection unit 212 of the protection circuit module.

The protection circuit module 200 may prevent overheating and an explosion of the battery cells 100 caused by overcharging, over-discharging, or an over current situation. The protection circuit module 200 may include a substrate 210 and a protection device 220 that is mounted on the substrate 210. The protection device 220 may include a safety device formed of a passive element, such as a resistor or a capacitor, and an active element, such as a field-effect transistor (FET), or may include one or more integrated circuits (ICs). In the current embodiment, the protection device 220 is mounted on the substrate 210, but the present invention is not limited thereto, and the protection device 220 may be included in the substrate 210 in another embodiment.

A connector 250 may be included at an end of the protection circuit module 200 to be electrically connected to an external electronic device. The connector 250 may be exposed and may protrude to the outside through a hole 450 formed in one side of the case 400.

The temperature sensor 300 generates temperature information at a measuring location as an electrical signal and transfers the electrical signal to the protection circuit module 200. The temperature sensor 300 may be a thermistor. The thermistor generates an electrical signal corresponding to a temperature of the thermistor and may be a resistive thermistor of which an electric resistance changes according to the temperature. The temperature sensor 300 may monitor a temperature change of the battery cell 100. Based on the results of the monitoring of temperature sensor 300, charging-discharging of the battery cell 100 is controlled. For this purpose, the electrical signal generated from the temperature sensor 300 may be transferred to the protection circuit module 200 via a cable 310 connecting the temperature sensor 300 and the protection circuit module 200.

The temperature sensor 300 may be aligned in a longitudinal direction of the protection circuit module. The temperature sensor 300 may be disposed near at least one side of the protection circuit module 200, and, as FIG. 1 illustrates, the temperature sensor 300 may be disposed on the right side of the protection circuit module 200.

The temperature sensor 300 may be disposed near the positive electrode tab 121 or near the negative electrode tab 122 of the battery cell 100. Since the positive electrode tab 121 and the negative electrode tab 122 include a metal material, the temperature of the battery cell 100 may be sensed near the positive and or negative electrode tabs 121 and 122. In order to prevent problems such as ignition or explosion by sensing an emergency situation of an abnormal increase in temperature during charging or discharging the battery cell 100, the temperature sensor 300 may be disposed near the electrode tabs 121 and 122 of the battery cell 100.

The case 400 may have locations and indications of the locations to place the battery cells 100 and the protection circuit module 200. The case 400 may include an insulating material. For example, the case 400 may include a polymer that may be molded by using heat or pressure.

The case 400 may be a frame that has an outer wall 401 that surrounds the battery cells 100 and the protection circuit module 200 included inside the case 400. The outer wall 401 extends in a thickness direction of the case 400. And an upper surface and a lower surface of the case 400 are substantially exposed. A part of the lower surface of the case 400 may include a lower rib 402, corresponding to the location of the protection circuit module 200, formed substantially perpendicular to the outer wall 401.

The lower rib 402 may be formed to transverse through a middle of the case 400. A protection circuit module loading unit 410 on which the protection circuit module 200 is loaded and a temperature sensor loading unit 420 on which the temperature sensor 300 is loaded may be included on the lower rib 402.

The protection circuit module 200 is situated on the protection circuit module loading unit 410 on the lower rib 402. The battery cell 100 may be placed on each of the left and right sides of the protection circuit module 200. Each of the battery cells 100 may be disposed such that the electrode tabs 121 and 122 are toward the protection circuit module 200. In order to prevent the battery cells 100 from separating from the case 400, a cell support rib 403 may be included in the case 400 at a location corresponding to sides of the battery cells 100 and may be in the same plane as the lower rib 402.

After the protection circuit module 200 and the battery cells 100 are placed in the case 400, the positive electrode tabs 121 and the negative electrode tabs 122 of the battery cells 100 may be welded to the connection units 212. For this purpose, holes 411 may be formed in the lower rib 402 at the locations that correspond to the connection units 212 so as to allow access for a welding rod. As described above with reference to FIG. 2, if the TCO assembly 130 is connected to the negative electrode tab 122, the positive electrode tab 121 of each of the battery cells 100 and the second spare lead 133 of the TCO assembly 130 may be welded on the connection unit 212 of the protection circuit module 200.

The lower surface of the case 400 other than the parts corresponding to the lower rib 402 and the cell support rib 403 is exposed. In addition, in some embodiments, all of the upper surface of the case 400 is exposed to accommodate the protection circuit module 200 and the battery cells 100. Because the lower and upper surfaces of the case 400 are exposed, thicknesses corresponding to the lower and upper surfaces of the case 400 may be reduced, and thus an overall thickness of the battery pack may be reduced. The case 400 accommodating the protection circuit module 200 and the battery cells 100 may be covered by labels 510 and 520.

Hereinafter, referring to FIGS. 3 and 4, a detailed structure of the case 400 and accommodation conditions of the protection circuit module 200 and the temperature sensor 300 will be described.

Figure 3:
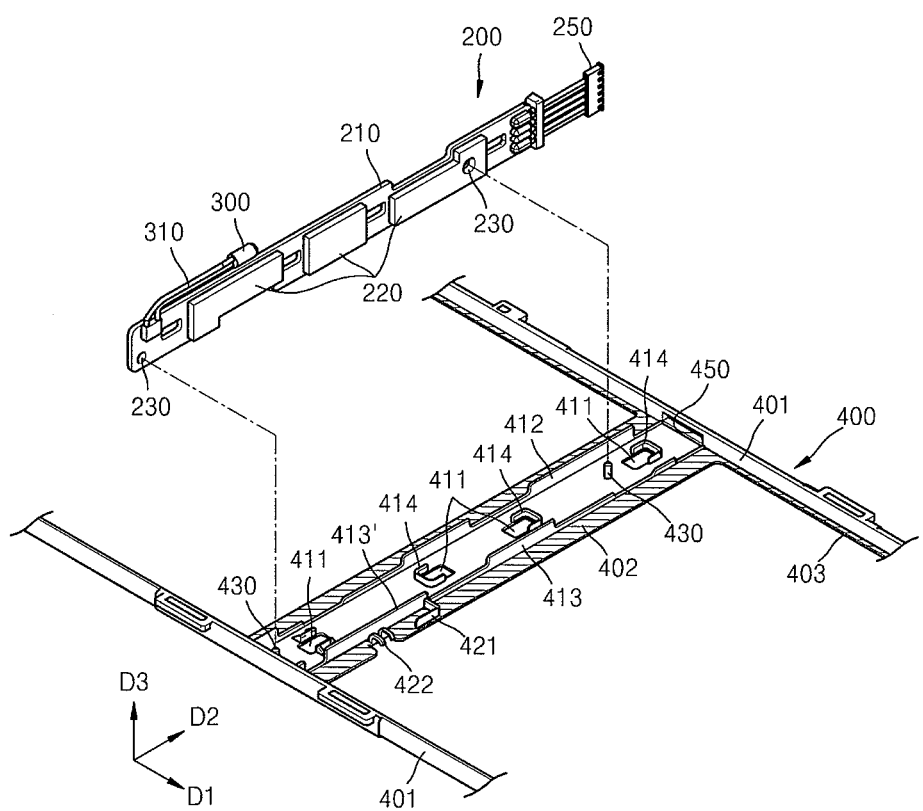
FIG. 3 is an exploded perspective view of embodiments of a case, a protection circuit module, and a temperature sensor from the battery pack of FIG. 1.
Figure 4:
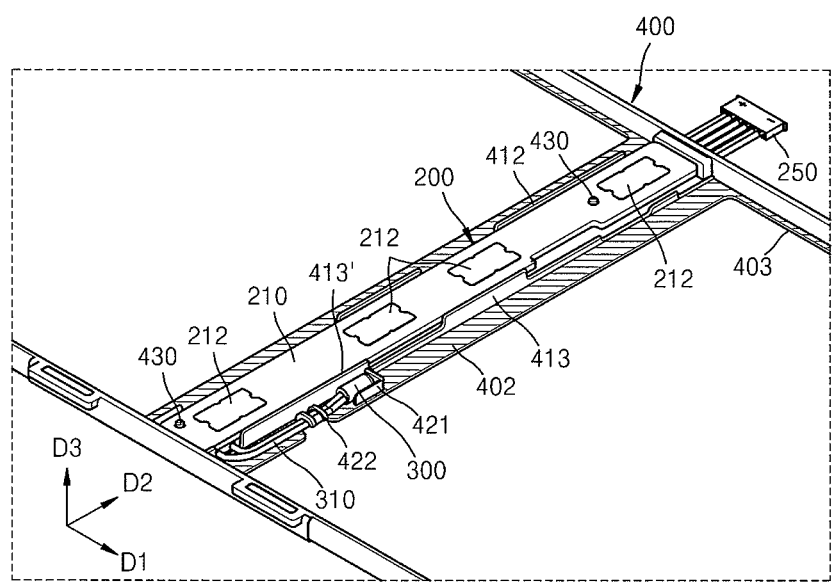
FIG. 4 is a perspective view illustrating an embodiment of the protection circuit module and the temperature sensor assembled in the case of FIG. 3.

FIG. 3 is an exploded perspective view of the case 400, the protection circuit module 200, and the temperature sensor 300 of the battery pack of FIG. 1. FIG. 4 is a perspective view illustrating the protection circuit module 200 and the temperature sensor 300 assembled in the case 400 of FIG. 3.

Referring to FIG. 3, the protection circuit module loading unit 410 on which the protection circuit module 200 is to be loaded, and the temperature sensor loading unit 420 on which the temperature sensor 300 is to be loaded may be prepared on the lower rib 402.

A first partition 412 and second partitions 413 and 413' are included on the protection circuit module loading unit 410, and are separated by a distance substantially the same as the width of the protection circuit module 200. Since the first partition 412 and second partitions 413 and 413' are spaced at a distance substantially equal to a width of the protection circuit module 200, and the protection circuit module 200 is to be placed between the first and second partitions 412, and 413 and 413', the protection circuit module 200 may be restricted between the first partition 412 and second partitions 413 and 413'.

One or more supporting elements 414 may be located between the first and second partitions 412, and 413 and 413', and may extend in a thickness direction, i.e., upward in the figure, of the case 400 to support the protection circuit module 200. The height of the supporting element 414 may be less than a thickness of the case 400, for example, the height of the supporting element 414 may be substantially equal to a height of the outer wall 401. At least some of the supporting elements 414 may support the protection circuit module 200 while being in contact with the protection device 220 on the lower surface of the substrate 210.

Guide holes 230 are included in the protection circuit module 200 to fix the protection circuit module 200 to the protection circuit module loading unit 410. At least one of the guide holes 230 may be formed on the substrate 210, and upwardly protruding guide pins 430 may be formed at locations corresponding to the guide holes 230 on the lower rib 402. As shown in FIG. 4, the protection circuit module 200 may be fixed to the case 400 as the guide pins 430 are inserted to the guide holes 230.

The temperature sensor loading unit 420 is formed along a longitudinal direction of the protection circuit module loading unit 410, and may be formed on one side of the protection circuit module loading unit 410. Thus, the temperature sensor 300 located near one side of the protection circuit module 200 may be parallel with the protection circuit module 200. The temperature sensor loading unit 420 may include a third partition 421 defining a space for the temperature sensor 300 to be accommodated, and a fixing element 422 to fix a location of the temperature sensor 300. In some embodiments, the third partition 421 defines a space for the temperature sensor 300. In some embodiments, the second partition 413' along with the first partition 412 may restrict the protection circuit module 200, and at the same time, may serve along with the third partition 421 to define a space for the temperature sensor 300 to be accommodated.

The third partition 421 defines a space for the temperature sensor 300 by, for example, being formed to at least partly surround the thermistor. The temperature sensor 300 may thus be accommodated in a space separated from the protection circuit module 200 and the battery cells 100, and may be protected from external impacts.

The fixing element 422 has a hook that is upwardly protruding with respect to the lower rib 402, and thus the cable 310 connecting the temperature sensor 300 and the protection circuit module 200 may be fixed in the case 400 using the fixing element 422. As the cable 310 is inserted and fixed to the fixing element 422, a location of the temperature sensor 300 may be fixed.

In some embodiments, once the cable 310 of the temperature sensor 300 is bonded to the fixing element 422, a thermally conductive adhesive, such as a thermally conductive silicone rubber composition, may be further coated on the fixing element 422.

According to the current embodiment, displacement of the temperature sensor 300 may be prevented, and the mounting of the temperature sensor 300 may be reliable. For example, the temperature sensor 300 may be protected by being in an independent space, which is separated from the protection circuit module loading unit 410, and thus damage to the temperature sensor 300 may be prevented. Also, reliability of values measured by the temperature sensor 300 may be increased by securely fixing the temperature sensor 300 at a location near the electrode tabs 121 and 122.

As described above, according to the one or more of the above embodiments, a battery pack with improved mounting of a temperature sensor is discussed. Displacement of the temperature sensor may be prevented. Damage to the temperature sensor may be prevented by disposing and protecting the temperature sensor in an independent space, and reliability of values measured by the temperature sensor may be increased by fixing the temperature sensor at a predetermined location.

Moreover, according to certain embodiments, a battery pack whose protection circuit module is convenient may be provided. Also, a time to assemble the battery pack may be reduced since battery cells may be placed after securing the temperature sensor to the protection circuit module. Electrode tabs of the battery cells and the protection circuit modules may then be easily welded through holes formed in a lower rib.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery pack comprising:
   a battery cell;
   a protection circuit module electrically connected to the battery cell;
   a temperature sensor configured to measure a temperature of the battery cell; and
   a case holding the battery cell and the protective circuit module, wherein the case comprises a particular space for the temperature sensor and a fixing element configured to fix the temperature sensor in the particular space, and wherein the case further comprises:
      first and second partitions defining a space in which the protection circuit module is placed, and
      a third partition together with the second partition defining the particular space for the temperature sensor,
      wherein the temperature sensor is arranged directly adjacent to each of the second and third partitions, and
      wherein the second and third partitions at least partially surround the temperature sensor.

2. The battery pack of claim 1, wherein the protection circuit module is located between first and second battery cells.

3. The battery pack of claim 1, wherein the protection circuit module is located substantially in the middle of the case.

4. The battery pack of claim 1, wherein the protection circuit module comprises a substrate and a protection device mounted on the substrate, wherein the substrate comprises guide holes extending through the substrate, and wherein the case comprises guide pins that protrude into the guide holes.

5. The battery pack of claim 1, wherein the case comprises a supporting element that supports the protective circuit module.

6. The battery pack of claim 1, wherein the temperature sensor comprises a thermistor.

7. The battery pack of claim 6, wherein the thermistor is electrically connected to the protective circuit module by a cable, wherein the fixing element comprises a hook fixing the cable to the case.

8. The battery pack of claim 1, wherein the temperature sensor is arranged so as to be substantially parallel with the protective circuit module, and is located adjacent to the protection circuit module.

9. The battery pack of claim 1, wherein the temperature sensor is disposed near an electrode tab of the battery cell.

10. A battery pack comprising:
    a battery cell;
    a protection circuit module electrically connected to the battery cell;
    a temperature sensor configured to measure a temperature of the battery cell; and
    a case holding the battery cell and the protective circuit module, wherein the case comprises:
       first and second partitions defining a space in which the protection circuit module is placed,
       a third partition defining a particular space in which the temperature sensor is placed, and
       a fixing element configured to fix the temperature sensor in the particular space,
       wherein the temperature sensor is arranged directly adjacent to each of the second and third partitions, and
       wherein the second and third partitions at least partially surround the temperature sensor.

11. A battery pack comprising:
    a battery cell;
    a protection circuit module electrically connected to the battery cell;
    a temperature sensor configured to measure a temperature of the battery cell and to transmit an electrical signal based on the temperature to the protective circuit module; and
    a case defining locations for the battery cell and the protective circuit module, wherein the case comprises:
       a frame comprising an outer wall that extends in a thickness direction and substantially surrounds the battery cell and the protective circuit module,
       a lower rib formed perpendicular to the outer wall,
       first and second partitions defining a space in which the protection circuit module is placed, and
       a third partition defining a particular space together with the second partition, the temperature sensor being placed in the particular space,
       wherein the first to third partitions and a fixing element configured to fix the temperature sensor to the lower rib are formed on the lower rib, and
       wherein the temperature sensor is arranged directly adjacent to each of the second and third partitions, and
       wherein the second and third partitions at least partially surround the temperature sensor.

12. The battery pack of claim 11, wherein the temperature sensor comprises a thermistor.

13. The battery pack of claim 11, wherein the thermistor is electrically connected to the protective circuit module through a cable, and wherein the fixing element comprises a hook fixing the cable to the case.

14. The battery pack of claim 11, wherein the lower rib is located substantially in a middle of the case.

15. The battery pack of claim 11, wherein the protection circuit module comprises a substrate and a protection device mounted on the substrate, wherein the substrate comprises guide holes extending through the substrate, and wherein the case comprises guide pins that protrude into the guide holes.

16. The battery pack of claim 15, wherein the protection device is located on a side of the substrate facing the lower rib.

17. The battery pack of claim 11, wherein the lower rib comprises a supporting element that supports the protective circuit module.

18. The battery pack of claim 11, wherein the temperature sensor is arranged so as to be substantially parallel with the protective circuit module, and is located adjacent to the protection circuit module.

19. The battery pack of claim 1, wherein the protection circuit module is interposed between first and second battery cells.

20. The battery pack of claim 1, wherein each of the protection circuit module and the temperature sensor has a major axis, and wherein the major axis of each of the protection circuit module and the temperature sensor are parallel.

21. The battery pack of claim 1, further comprising a temperature cutoff (TCO) electrically connected to an electrode tab of the battery cell, wherein the TCO is arranged adjacent to the temperature sensor.

\* \* \* \* \*